(12) United States Patent
James et al.

(10) Patent No.: US 8,158,563 B2
(45) Date of Patent: Apr. 17, 2012

(54) SEALANT COMPOSITION

(75) Inventors: Simon James, Le Plessis-Robinson (FR); Michel Michaux, Verrieres-le-Buisson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/961,091

(22) Filed: Dec. 6, 2010

(65) Prior Publication Data

US 2011/0077175 A1 Mar. 31, 2011

Related U.S. Application Data

(63) Continuation of application No. 12/259,532, filed on Oct. 28, 2008, now abandoned.

(30) Foreign Application Priority Data

Oct. 30, 2007 (EP) .................................. 07119640

(51) Int. Cl.
*C09K 8/74* (2006.01)
*E21B 33/13* (2006.01)

(52) U.S. Cl. ......... 507/269; 507/902; 507/906; 166/293

(58) Field of Classification Search .................. 507/269, 507/901, 906; 166/293
See application file for complete search history.

(56) References Cited

U.S. PATENT DOCUMENTS

| | | | |
|---|---|---|---|
| 3,458,567 A | 7/1969 | Francis | |
| 4,403,059 A | 9/1983 | Laut et al. | |
| 4,762,443 A | 8/1988 | Gouvenot | |
| 5,140,061 A | 8/1992 | Feder | |
| 5,431,728 A | 7/1995 | Frouin et al. | |
| 6,060,535 A * | 5/2000 | Villar et al. | 166/293 |
| 6,312,515 B1 | 11/2001 | Barlet-Gouedard et al. | |
| 2006/0234871 A1* | 10/2006 | Dalrymple et al. | 507/211 |
| 2006/0248663 A1 | 11/2006 | Tremblay et al. | |

FOREIGN PATENT DOCUMENTS

| | | |
|---|---|---|
| EP | 0621247 | 10/1994 |
| EP | 0748782 | 12/1996 |
| GB | 2124276 | 2/1984 |
| WO | 2007/088322 | 8/2007 |

OTHER PUBLICATIONS p. 247 Well Cementing, 2nd Edition, E. Nelson and D. Guillot editors, Schlumberger 2006.
p. 521-543 Well Cementing, 2nd Edition, E. Nelson and D. Guillot editors.

* cited by examiner

*Primary Examiner* — Timothy J. Kugel
*Assistant Examiner* — Aiqun Li
(74) *Attorney, Agent, or Firm* — Matthias Abrell

(57) ABSTRACT

A sealant composition, comprising an alkali metal silicate and a calcium containing inorganic compound, wherein the particles of the calcium containing compound have a mean particle size that is submicron, is useful for sealing cracks, fissures and voids in subterranean wells, thereby restoring zonal isolation. The mean particle size of the calcium containing compound is preferably smaller than 100 nm.

6 Claims, No Drawings

SEALANT COMPOSITION

CROSS-REFERENCE TO RELATED APPLICATIONS

This application is a Continuation application from U.S. patent application Ser. No. 12/259,532 filed on Oct. 28, 2008 which claimed the benefit of EP Patent Application 07119640.6 filed Oct. 30, 2007, entitled "Sealant Composition."

TECHNICAL FIELD

This invention relates to a sealant fluid, in particular a composition comprising an alkali metal silicate solution and a calcium-containing inorganic compound that can be used to seal narrow cracks and pore spaces of subterranean wells.

BACKGROUND ART

Sometimes in subterranean wells it is necessary to plug small voids generally to prevent unwanted fluid flow. These voids may be cracks in the cement, or micro-annuli between the casing and the cement or between the cement and the formation. These voids could also be pore spaces between gravel in gravel-packs in zones that are producing too much water to remain economic. A common method of plugging these voids is to inject a cement formulation where the cement is made from micro-fine cement particles (see p 247 Well Cementing, $2^{nd}$ Edition, E. Nelson and D. Guillot editors, Schlumberger 2006) where the micro-fine particles have a median size of 3-5 microns. The process is generically called squeeze cement (pp 521-543 Well Cementing, $2^{nd}$ Edition, E. Nelson and D. Guillot editors). U.S. Pat. No. 6,312,515 also discloses a squeeze cementing method using a cement formulation with micro-fine particles. However, even with this technology there is a lower limit to the size of the voids that can be filled when using micro-fine cementing technology because of the particle size.

It is also known to use calcium carbonate in a silicate containing solution in sealant compositions. U.S. Pat. No. 4,762,443 describes a fluid composition comprising a sodium metasilicate and a calcium carbonate which is used to make porous material impervious by injecting the composition into the material, which will then harden and set over time.

However the voids (microannuli, fractures and pores) in subterranean wells that the sealant composition needs to penetrate can be very small and narrow, and therefore the solid particles in sealant compositions need to be small enough to effectively penetrate into these gaps. However when the two components are mixed to form the composition for injecting, the reaction between the calcium carbonate and sodium metasilicate can occur very quickly. This can cause problems due to the onset of thickening of the composition before it has sufficiently penetrated the pores and fractures of the formation. If the composition becomes too thick to pump properly the sealant composition may not be correctly placed in all the voids before it sets. This may reduce the extent of, or even prevent the formation of, the barrier that is meant to be created throughout the formation. In addition, the subterranean formations may have temperatures higher than surface conditions which lead to even higher reaction rates between the calcium carbonate and the silicate solution.

Therefore it is an object of the invention to provide a sealant composition that can penetrate into the narrow voids, such as fractures and pore spaces, of a wellbore.

DISCLOSURE OF THE INVENTION

Accordingly a first aspect of the invention comprises a sealant composition comprising an alkali metal silicate and a calcium-containing inorganic compound wherein the particles of the calcium containing compound have a mean particle size that is submicron. The extremely small size of the calcium containing compound allows the fluid to penetrate into the small fractures and pore spaces in the formation.

Calcium compounds with a solubility in water <2 g/Litre at 20° C. are preferred. Preferably, the calcium containing compound is calcium carbonate. Alternatively, other low solubility calcium compounds, e.g. calcium hydroxide, may be used.

Preferably the alkali metal silicate is sodium metasilicate. However, other sodium silicates or potassium or lithium silicates can be used.

Preferably the calcium particles have a mean size below 500 nm. The particles may have a mean particle size between 350 and 200 nm. Alternatively the mean particle size is below 100 nm. The size of the calcium carbonate particles can depend on the application of the sealant composition.

The particles of the calcium containing compound may comprise a hydrophobic coating. For example a calcium carbonate may be treated with a fatty acid such as stearic acid to form a hydrophobic coating of calcium stearate on the calcium carbonate particles.

The composition can also comprise an antifoam and/or a surfactant. Other additives may also be present in the composition such as, fluid loss control additives, retarders, and viscosity control additives, such as viscosifiers or dispersants.

A second aspect of the invention comprises a method for sealing voids in a wellbore comprising injecting a composition as described above into a void of the wellbore and letting the composition set. When the fluid composition sets it provides an impermeable barrier plugging pores, fractures and other voids in the zone of the wellbore the composition has been injected into. The voids can be pores and cracks in the formation, cracks in the cement sheath, voids (micro-annuli) between the casing and the cement or between the cement and the formation, and/or pores in the gravel packs.

Preferably the method comprises pumping a composition described above from the surface down the welllbore before injecting.

Alternatively the method can comprise pumping an alkali metal silicate compound and a calcium containing inorganic compound separately from the surface down the borehole; and allowing the alkali metal silicate compound and the calcium containing compound to mix together downhole before injecting the composition into a void. Each compound is initially present as separate composition which are each then pumped down the borehole and allowed to mix such that the silicate/calcium containing sealant composition is formed downhole The sealant composition can be used in low temperature environments. For example temperatures may be as low as 4° C. at the seabed in deepwater environments and below 0° C. in permafrost zones.

MODE(S) FOR CARRYING OUT THE INVENTION

The sealant composition of the invention comprises a calcium containing inorganic compound, such as calcium carbonate, in a solution of an alkali metal silicate. Preferably the solution is sodium silicate with a $SiO_2$ to $Na_2O$ ratio <1.5, such as a sodium metasilicate which has a $SiO_2$ to $Na_2O$ ratio of 1:1, but other sodium silicates with $SiO_2$ to $Na_2O$ ratio $\geq 1.5$ may be used. Also potassium or lithium silicates may be used. In order that the composition can penetrate the very narrow fractures and formation pore spaces of the formation surrounding the wellbore, the solids of the composition have to be of a very small size. Therefore the composition comprises nanosized calcium carbonate particles. By nanosized it is meant particles that are sub microns size i.e. less than 1000 nm in size, preferably less than 500 nm.

The nanosized calcium carbonate particles are dispersed in an alkali metal silicate solution. This creates an ultra-fine suspension that can be injected into voids in the near-wellbore region and is capable of penetrating the pores and cracks in this region. The fluid composition will set to form a hard impermeable mass in the pores and fractures and plug these gaps to prevent lost circulation. When the calcium carbonate is mixed into the silicate solution calcium ions react with the silica in the solution to create calcium silicate hydrates. The calcium carbonate can be prepared from ground marble, limestone, calcite or aragonite.

As the small particles have a very high surface area they are very reactive. In some conditions this will result in the sealant composition setting too quickly, before the composition has enough time to sufficiently penetrate the pores and fractures. Therefore in some situations further modifications to the compositions are needed to control the thickening time of the sealant composition so that the composition does not set before it has reached its intended destination.

In one embodiment the setting time of the sealant fluid can be controlled by adjusting the size of calcium carbonate particles that are dispersed in the sodium metasilicate solution. By increasing the size of the particles the surface area is decreased and therefore the particles are less reactive. The size of the particles still remain in the nanosize range and therefore are small enough to fit in the narrow cracks and pores of the formation, however the composition will have a delayed setting time compared to a similar composition having smaller particles.

The setting time of the sealant fluid can also be increased by using hydrophobically coated calcium carbonate particles in the solution of the sodium metasilicate. A sealant fluid comprising hydrophobically coated calcium carbonate particles will have a longer setting time than a composition with calcium carbonates particles that are the same size but are not coated. The setting time can also be adjusted by changing the molar ratio of $SiO_2$ to $Na_2O$. Increasing the molar ratio will increase the setting time.

The invention is now described with reference to the following examples.

EXAMPLES

The products used in the examples are:
Sodium Metasilicate:
Sodium metasilicate (anhydrous) (available from Van Eyck Chimie). In each of the examples the sodium metasilicate is used as a solution containing 30 g of sodium metasilicate and 70 g of distilled water.
Calcium Carbonate:
Socal® 31 (Solvay): a rhombohedral calcite (a precipitated calcium carbonate) with a mean particle size of 70 nm
Socal® 90A (Solvay): an ortho-rhombic aragonite (a precipitated calcium carbonate) with a mean particle size between 200 nm and 350 nm.
Socal® 312 (Solvay): a version of Socal® 31 that has a hydrophobic coating.
The calcium carbonate is formed by precipitation from a lime solution. The hydrophobically modified calcium carbonate is reacted with fatty acids in suspension.

Example 1

To demonstrate that the system sets to a solid 30 g of calcium carbonate with a mean particle size of 70 nm (Socal® 31) is mixed in a Waring blender with 100 g of the sodium metasilicate solution, which contains 30 g sodium metasilicate and 70 g distilled water. The solids disperse easily in the solution and the resulting suspension is poured into a container. After 3 hours at room temperature the suspension had set into a solid homogenous mass. No excess fluid is present on the top of the solid.

Example 2

To demonstrate the difficulty in retarding the calcium carbonate/sodium metasilicate system five samples were prepared using no retarder or a different conventional cement retarder in the suspension. 0.1 g of an antifoam and an amount of cement retarder as indicated below is added to 100 g of a sodium metasilicate solution, containing 30 g sodium silicate and 70 g water. 30 g of calcium carbonate with a mean particle size of 70 nm (Socal® 31) is added to the solution and mixed in a Waring blender. The time for the system to set as a function of retarder type and concentration was determined visually at room temperature. The results are given below in Table 1.

TABLE 1

| Sample | 1 | 2 | 3 | 4 | 5 |
|---|---|---|---|---|---|
| Sodium Metasilicate solution | 100 g | 100 g | 100 g | 100 g | 100 g |
| Calcium carbonate (Socal ® 31) | 30 g | 30 g | 30 g | 30 g | 30 g |

TABLE 1-continued

| Sample | 1 | 2 | 3 | 4 | 5 |
|---|---|---|---|---|---|
| Antifoam | 0.1 g | 0.1 g | 0.1 g | 0.1 g | 0.1 g |
| Retarder | — | Sodium Lignosulphonate | Calcium Glucoheptonate | Boric Acid | Sodium Gluconate |
| Amount of Retarder | — | 2 g | 1 g | 1.5 g | 1.5 g |
| Setting Time | 10 min | 20 min | 25 min | 30 min | 20 min |

The results show that while the conventional cement retarders do increase the setting time of the system, the setting time is not increased substantially and would not be sufficient to use for injecting into the cracks and pores of most wellbore situations.

Example 3

To demonstrate alternative mechanisms of retardation of the calcium carbonate/sodium metasilicate system three samples were prepared using different types of calcium carbonate. 0.1 g of antifoam is added to 100 g of sodium metasilicate solution, which contains 30 g sodium silicate and 70 g water. 30 g of calcium carbonate as indicate below is added to the sample and mixed with a Waring Blender. A surfactant is added to the sample containing the Socal® 312 calcium carbonate to help disperse the hydrophobically modified calcium carbonate in the solution. The setting time is determined visually at room temperature for each sample. The results are given below in Table 2.

TABLE 2

| Sample | 6 | 7 | 8 |
|---|---|---|---|
| Calcium carbonate | Socal ® 31 (30 g) | Socal ® 312 (30 g) | Socal ® 90A (30 g) |
| Particle size | 70 nm | 70 nm | 250-300 nm |
| Hydrophobic coating | No | Yes | No |
| Sodium metasilicate solution | 100 g | 100 g | 100 g |
| Antifoam | 1 g | 1 g | 1 g |
| Surfactant | — | 2 g | — |
| Setting Time | 30 min | 85 min | 120 min |

The results show that the setting time of the system can be lengthened by either using slightly larger particles sizes, but still within in the sub micron range, or by using hydrophobic coated calcium carbonate particles.

The use of Socal®90A calcium carbonate with a mean particle size of 250-300 nm resulted in a sealant fluid with a setting time considerably longer than the setting of the composition using Socal®31 calcium carbonate where the particles only have a mean size of 70 nm. The larger particles have reduced surface area and therefore are less reactive than the smaller particles.

The examples show that conventional cement retarders used to slow the setting of compositions may not be suitable if it was needed to significantly slow the setting time of the fluid, as they do not sufficiently retard the setting time of calcium carbonate and sodium metasilicate composition, when nanosized particles are used. Therefore other ways of slowing setting time for such compositions containing such small particles are needed. To increase the setting of the compositions the size of the calcium carbonate particles can be increased, but still remain in the nanosize range. Alternatively hydrophobic coated calcium carbonate particles can be used. When hydrophobic coated particles are used, a surfactant can be used in the composition to help disperse the particles.

Another way to increase the setting time of the system is to increase the $SiO_2$ to $Na_2O$ ratio.

The particles used in the composition are small enough to penetrate the fractures and pores of the formation before the composition set. While the setting time of the composition can be delayed enough to allow the sodium metasilicate and calcium carbonate to be mixed together before pumping down the wellbore and injection into the voids. This simplifies the process as rather then using a two stage process whereby each component is injected separately, the composition can be injected as one composition. If a two stage process system is used the silicate containing composition and a calcium containing composition are mixed together downhole after being pumped separately down the borehole but before injection into the void. A silicate containing solution and a calcium containing solution can be pumped separately down the wellbore, either by pumping the compositions down two separate tubes or down two separate compartments of the same tube. Alternatively one component is pumped down a tube or pipe in the wellbore, such as the drill pipe or coiled tubing, and the other component is pumped down the annulus formed by the tube and the casing/wellbore, before mixing at the place of injection.

The sealant fluid is also suitable for use in low temperature applications, where conventional sealant systems can take a long time to set, such as at the seabed in deep water environments, which the temperature can be as low as 4° C. or permafrost zones where temperatures can be below 0° C. In this situation it may be sufficient to provide calcium carbonate particles of any size in the nanosize range, without the need to retard the setting time of the composition, i.e. by increasing the particles size or using hydrophobic particles, as the low temperatures will slow the reactions and setting time down.

When the calcium carbonate/sodium metasilicate composition with nanosized calcium carbonate particles is used in low temperature environments, the sealant composition will have a faster setting time than conventional sealant systems.

The invention claimed is:

1. A method of sealing voids in a subterranean well, comprising:
   (i) preparing a sealant composition comprising an alkali metal silicate solution and an inorganic calcium containing compound having particles with a mean particle size less than 100 nanometers, the particles having a hydrophobic coating;
   (ii) injecting the sealant composition into a void; and
   (iii) allowing the sealant composition to set.

2. The method according to claim 1, wherein the alkali metal silicate is sodium metasilicate.

3. The method according to claim 1, wherein the solubility of the calcium containing compound in water is less than 2 g/L at 20° C.

4. The method according to claim 1, wherein the sealant composition further comprises a surfactant.

5. The method according to claim 1, wherein the sealant composition further comprises an antifoam agent.

6. A method of sealing voids in a subterranean well, comprising:
(i) pumping an alkali metal silicate solution, and a calcium containing compound having a mean particle size less than 100 nanometers, separately down a borehole; and
(ii) allowing the alkali metal silicate and calcium containing compound to mix together to form a sealant composition downhole before the composition penetrates into a void.

* * * * *